United States Patent [19]
Tanaka et al.

[11] Patent Number: 5,368,650
[45] Date of Patent: Nov. 29, 1994

[54] METHOD AND APPARATUS FOR WASHING CONVEYER BELT IN HEAT TREATMENT APPARATUS

[75] Inventors: Masaaki Tanaka; Tomio Sugimoto, both of Sano, Japan

[73] Assignee: House Food Industrial Co., Ltd., Higashi-Osaka, Japan

[21] Appl. No.: 40,283

[22] Filed: Mar. 30, 1993

[30] Foreign Application Priority Data

Oct. 15, 1992 [JP] Japan ................................. 4-276873

[51] Int. Cl.⁵ ............................................. B08B 3/02
[52] U.S. Cl. ................................. 134/15; 134/122 R; 134/104.1; 198/495; 99/357
[58] Field of Search ............... 134/104.1, 122 R, 64 R, 134/199, 15, 16; 198/495; 99/357

[56] References Cited

U.S. PATENT DOCUMENTS

| | | | |
|---|---|---|---|
| 1,873,437 | 8/1932 | Linfesty | 198/495 |
| 2,660,293 | 11/1953 | Merril | 198/495 |
| 2,881,463 | 4/1959 | Vogel . | |
| 3,440,973 | 4/1960 | Lanham et al. | 198/495 |
| 3,998,321 | 12/1976 | Schultz | 198/495 |
| 4,860,883 | 8/1989 | Knaul et al. | 198/493 |
| 4,960,200 | 10/1990 | Pierce | 198/495 |

FOREIGN PATENT DOCUMENTS

| | | |
|---|---|---|
| 2606678 | 5/1988 | France . |
| 2630413 | 10/1989 | France . |
| 1066948 | 10/1959 | Germany . |
| 1102648 | 3/1961 | Germany . |
| 8712326 | 2/1988 | Germany . |
| 3629415 | 3/1988 | Germany . |
| 3637340 | 5/1988 | Germany . |

OTHER PUBLICATIONS

Iwata, Abstract of Japanese 61-188316(A), Jan. 14, 1987, vol. 11, No. 14.

*Primary Examiner*—Frankie L. Stinson
*Attorney, Agent, or Firm*—Popham, Haik, Schnobrich & Kaufman, Ltd.

[57] ABSTRACT

A method for washing a conveyer belt in a heat treatment apparatus permits washing of the conveyer belt without causing splashing of a washing fluid so as not to cause danger in operation and contaminate the surroundings and can cause deformation of the conveyer belt upon washing so as to vary the surface configuration and positional relationship of the components for making washing effective. The method comprises the steps of defining a washing fluid bath containing a washing fluid, and placing the washing fluid bath in a portion of a traveling path of the conveyer belt, within which at least one of configuration and positional relationship of components of the conveyer belt varies, for dipping the conveyer belt at the portion within the washing fluid bath. Apparatus for carrying out the method includes a washing bath which can be shifted between a first position away from a vertically deflected portion of the conveyor belt and a second position dipping the vertically deflected portion of the conveyer belt in the washing bath. The washing bath is shifted between the first and second positions by a pivotal lever.

11 Claims, 6 Drawing Sheets

METHOD AND APPARATUS FOR WASHING CONVEYER BELT IN HEAT TREATMENT APPARATUS

BACKGROUND OF THE INVENTION

1. Field of the Invention

The present invention relates generally to a method and an apparatus for washing a conveyer belt in a heat treatment apparatus, such as a food dryer, baking or fryer apparatus. More specifically, the invention relates to a method and an apparatus for washing a conveyer belt in a continuous dryer apparatus for dryer the food while the feed is continuously fed, a continuous baking apparatus for baking a food material, or a continuous fryer for fryer a food material, which can wash the conveyer belt in the installed condition in the continuous dryer apparatus, the continuous baking apparatus or the continuous fryer apparatus.

2. Description of the Related Art

In the conventional washing method for a conveyer belt in a continuous dryer, baking and fryer apparatus, a washing fluid pan is provided below a straight portion of the transporting path of the conveyer belt so that a washing fluid is sprayed to the conveyer belt from the lower side.

Such conventional washing method for the conveyer belt of the continuous dryer, backing or fryer apparatus may cause splashing of the washing fluid to cause danger in operation and contaminate the surrounding. Also, such conventional washing method cannot use the washing fluid effectively. Furthermore, since the washing fluid is sprayed onto the straight portion of the transporting path of the conveyer from the lower side, the conveyer belt will not be deformed upon spraying the washing fluid to make the washing of the conveyer belt ineffective.

In view of the drawback in the prior art, it is an object of the present invention to provide a method and apparatus for washing a conveyer belt of a heat treatment apparatus, such as a continuous dryer apparatus, a continuous backing apparatus or a continuous fryer, which can perform washing of the conveyer belt without causing splashing of a washing fluid so as not to cause danger in operation and contaminate the surrounding.

Another object of the invention is to provide a method and apparatus for washing the conveyer belt, which can cause deformation of the conveyer belt upon spraying the washing fluid so as to vary the surface configuration and positional relationship of the components for making washing effective.

SUMMARY OF THE INVENTION

In order to accomplish the above-mentioned and other objects, and in accordance with one aspect of the invention, a method for washing a conveyer belt in a heat treatment apparatus comprises the steps of:

defining a washing fluid bath containing a washing fluid; and placing the washing fluid bath in a portion of a traveling path of the conveyer belt, within which at least one of configuration and positional relationship of components of the conveyer belt varies, for dipping the conveyer belt at the portion within the washing fluid bath.

Preferably, the method further comprises a step of placing the washing fluid bath out of the traveling path of the conveyer belt in an operational mode of the heat treatment apparatus other than conveyer belt washing mode. Also, the method may further comprise a step of driving the conveyer belt along the traveling path at a first speed in the operational modes of the heat treatment apparatus other than the conveyer belt washing mode and at a second speed different from the first speed in the conveyer belt washing mode. In this case, the second speed is lower than the first speed.

It is further possible that the method further comprises a step of injecting washing fluid toward the conveyer belt, preferably, the injection of washing fluid is performed within the washing fluid bath.

According to another aspect of the invention, an apparatus for washing a conveyer belt of a heat treatment apparatus which has the conveyer belt driven to travel along a predetermined traveling path including at least one deflecting portion where the traveling direction of the conveyer belt is varied, comprises:

a washing bath containing a washing fluid therein; and means for placing the washing bath at the deflecting portion of the traveling path so that the conveyer belt is dipped within the washing fluid in the washing bath while it travels across the deflecting portion.

In the preferred construction, the apparatus further comprises a conveyer belt driving means for driving the conveyer belt along the traveling path, the conveyer belt driving means drives the conveyer belt at a first speed while the heat treatment operates in a process mode for performing heat treatment, and at a second speed different from the first speed while the conveyer belt washing apparatus is active. It is preferred that the first speed is higher than the second speed.

The apparatus may further comprise means for shifting the washing bath between a first position away from the deflected portion and a second position dipping the conveyer belt in the deflected portion within the washing fluid in the washing bath, the shifting means placing the washing bath at the first position while the heat treatment operates in a process mode for performing heat treatment, and at a second position while the conveyer belt washing apparatus is active.

Also, the apparatus may further comprise means for injecting washing fluid toward the conveyer belt. In this case, the washing fluid injecting means is disposed within the washing bath so as to inject the washing fluid toward the conveyer belt within the washing fluid in the washing bath.

In the practical construction, the apparatus may further comprise a manually operable means associated with the shifting means for selectively placing the washing bath at first and second positions. Preferably, the shifting means includes a pivotal lever having a first end pivoted on a stationary structural component of the washing apparatus, a second end connected to the washing bath, and an actuation point to which the operational force through the manually operable means acts, the actuation point being placed in the vicinity of the second end. Furthermore, the apparatus may comprise a base frame having a plurality of wheels for movement of overall apparatus.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

Figure 1:
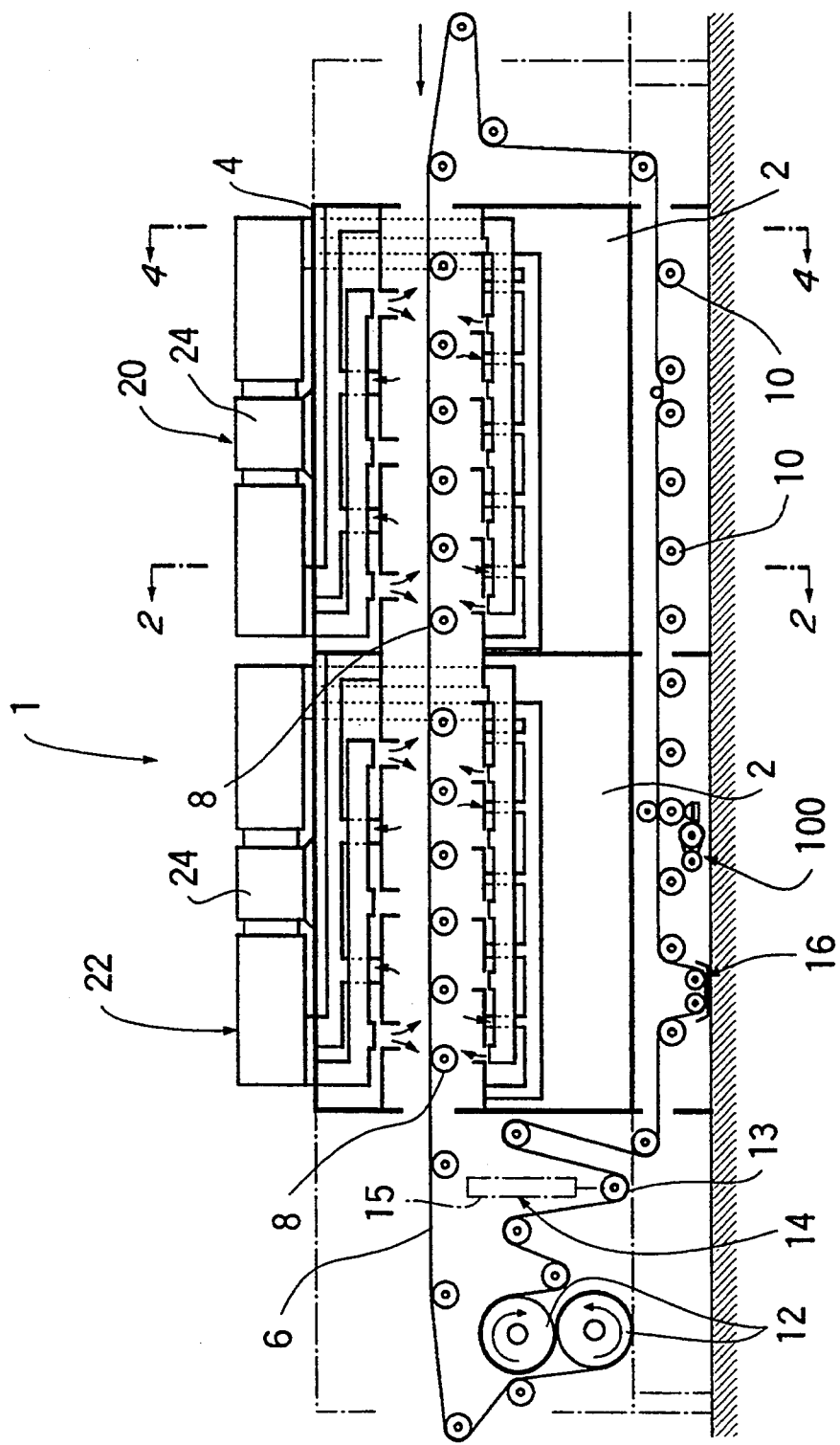
FIG. 1 is a vertical section along a transporting direction of a food material dryer apparatus incorporating the preferred embodiment of ta conveyer belt washing apparatus of the present invention.
Figure 2:
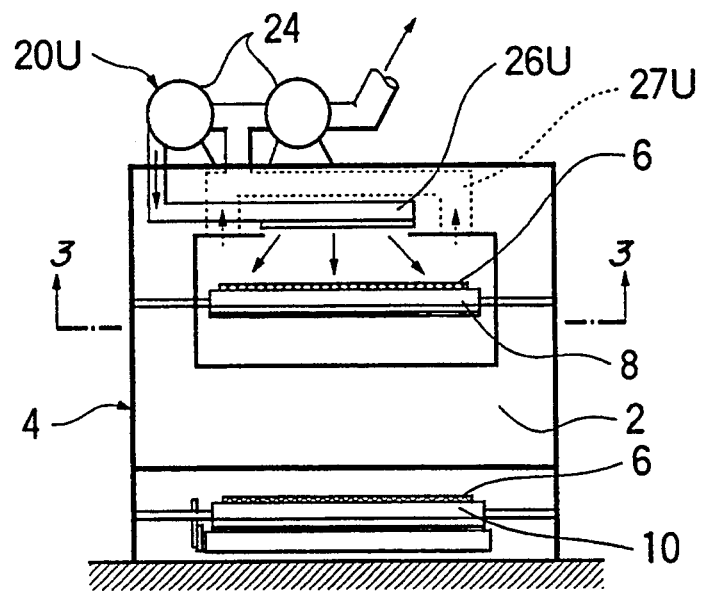
FIG. 2 is a vertical section along a plan perpendicular to the transporting direction of the food material dryer apparatus taken along line A—A of FIG. 1.
Figure 3:
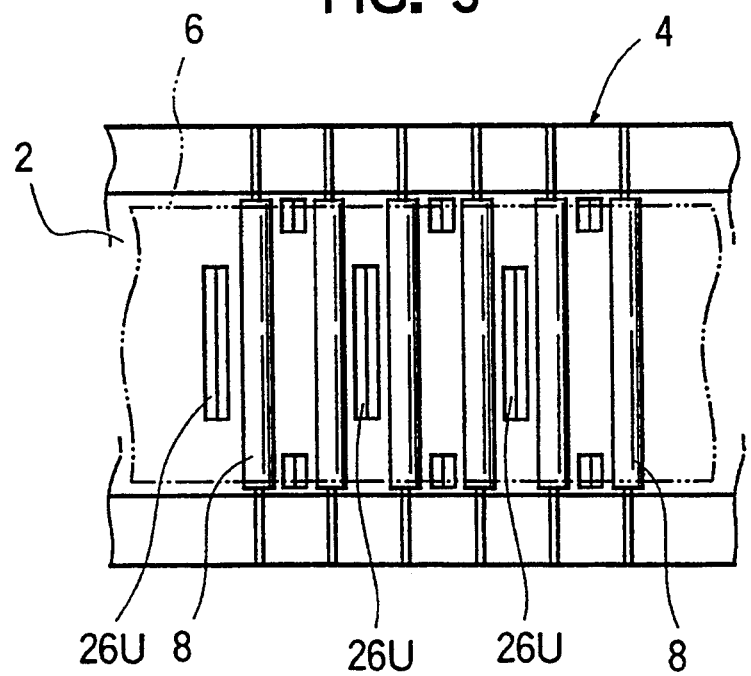
FIG. 3 is a horizontal section of the food dryer apparatus taken along line B—B of FIG. 2.
Figure 4:
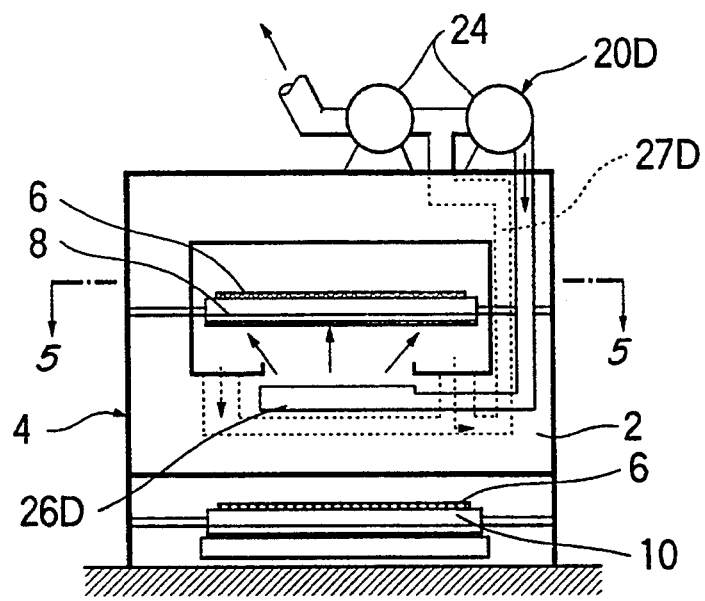
FIG. 4 is a vertical section along a plan perpendicular to the transporting direction of the food material dryer apparatus taken along line C—C of FIG. 1.
Figure 5:
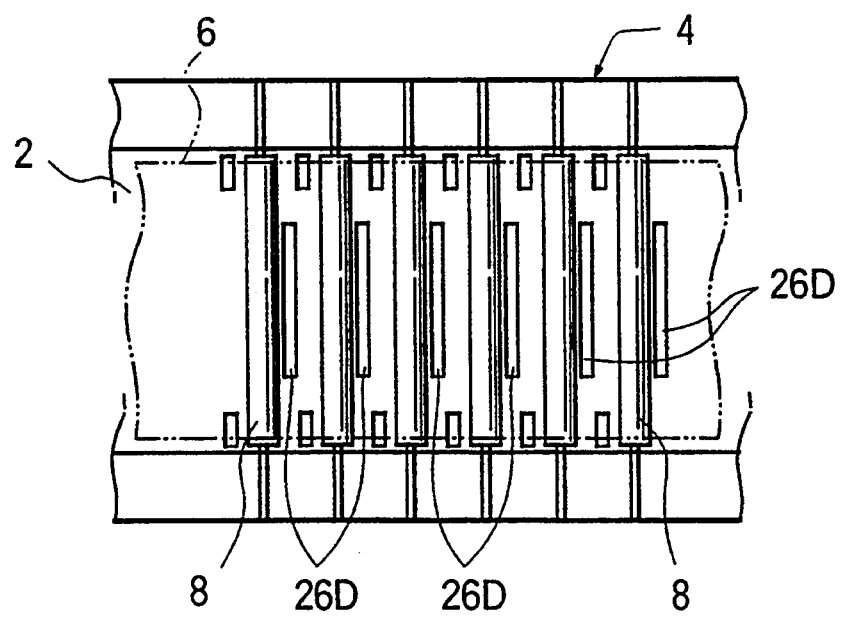
FIG. 5 is a horizontal section of the food material dryer apparatus taken along line D—D of FIG. 4.

Discussion is given hereinafter about the preferred embodiment of a washing apparatus for a conveyer belt according to the present invention, in terms of an application of a food material dryer apparatus. As shown in FIG. 1, the food material dryer apparatus 1 includes a housing 4 defining a drying chamber 2. An endless type net conveyer 6 is arranged to run in and out of the housing 4. The net conveyer 6 is supported by a plurality of supporting rollers 8 rotatably arranged within the housing 4 and supporting rollers 10 rotatably arranged outside of the housing 4, and driven to run by a pair of drive rollers 12. An oil applying device 100 for applying an oil for the net conveyer 6, a tension adjusting device 14 for absorbing expansion of the net conveyer and whereby adjusting a tension on the net conveyer and a net conveyer washing apparatus 16 are arranged outside of the housing 4. The tension adjusting device 14 includes a tension adjuster roller 13 which is rotatable and movable in a direction perpendicular to the traveling direction of the net conveyer 6. The tension adjusting roller 13 is associated with an air cylinder 15 to be driven for varying the position relative to the path of the net conveyer 6 for removing drooping of the net conveyer.

In FIG. 1, a food material supply apparatus (not shown) which kneads the food material and continuously supplies it to the food material dryer apparatus 1 is provided at the right side of the housing. On the other hand, at the left side of the housing 4, a continuous fryer apparatus for fryer the food material is arranged.

Identical constructions of four hot air blowing devices 20, 22 are mounted on the housing 4. As shown in FIGS. 1 to 5, the upper blowing portion 20U of the hot air blowing device 20 compresses hot air generated by a gas-type heating device 24 arranged on the housing 4 and blows the compressed hot air through three blowing nozzles 26U provided above the net conveyer 6 on the food material developed on essentially the overall width of the net conveyer. The hot air blown to the food material is discharged from the discharging portion 3 provided in an upper wall of the housing.

The lower blowing portion 20D of the hot air blowing device 20 compresses hot air generated by the gas-type heating device 24 arranged on the housing 4, and blows the compressed hot air through three blowing nozzles 26D provided below the net conveyer 6 on the food material developed on essentially overall width of the net conveyer. The hot air blown to the food material is discharged through a discharge portion 27D provided at the upper wall of the housing 4.

Figure 6:
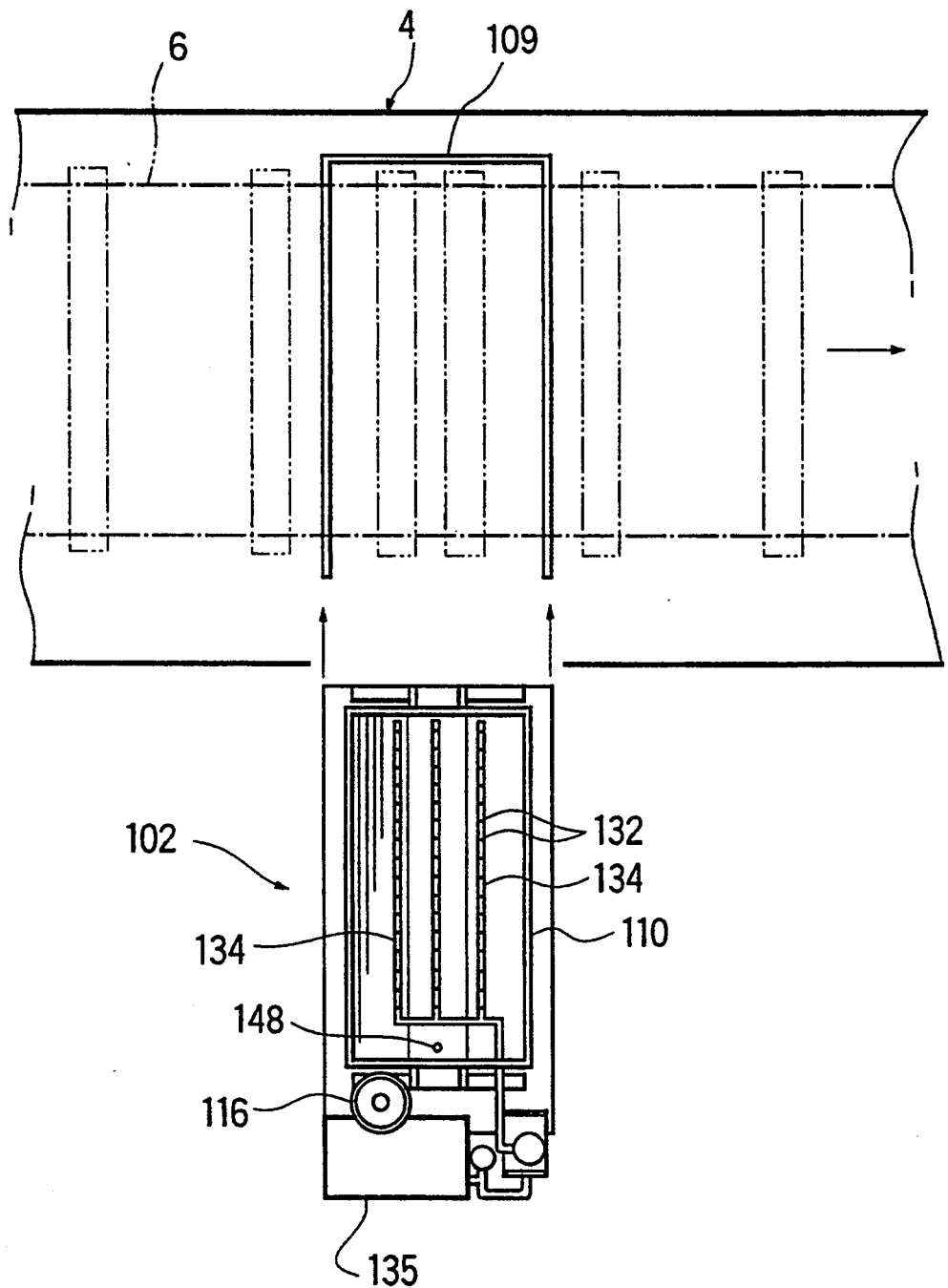
FIG. 6 is a plan view of washing apparatus for a conveyer belt.
Figure 7:
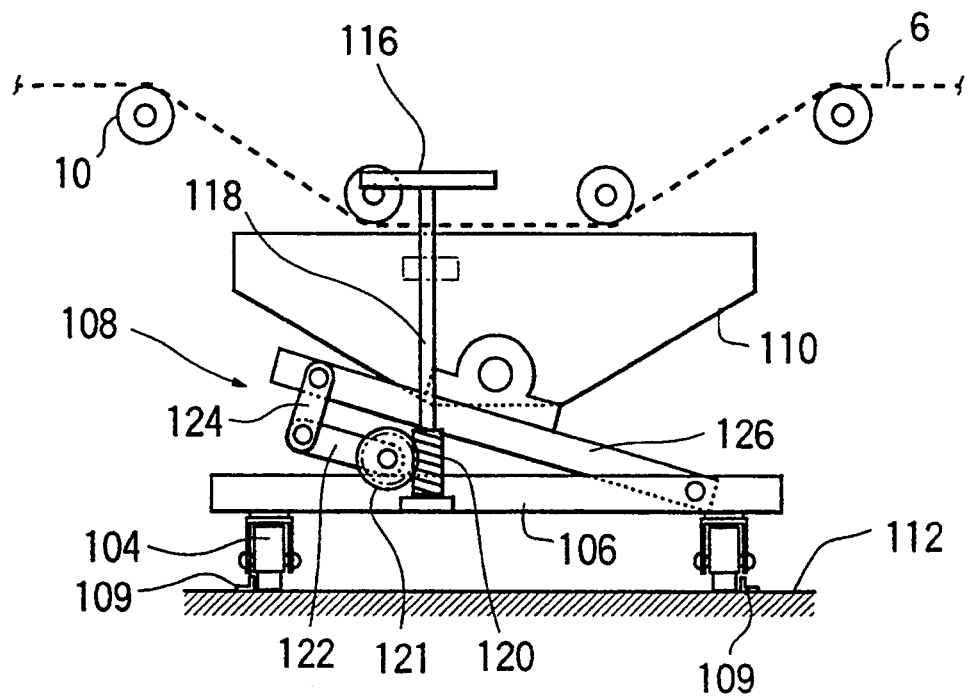
FIG. 7 is a side elevation of the washing apparatus, in which a washing fluid pan is positioned at a lowered position.
Figure 8:
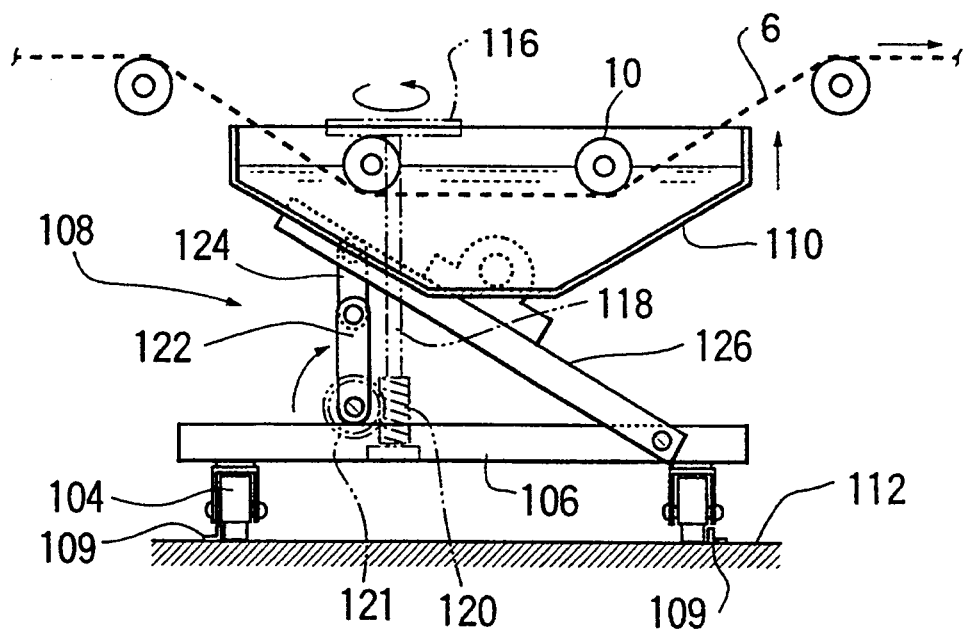
FIG. 8 is a side elevation of the washing apparatus, in which a washing fluid pan is positioned at an elevated position.

As shown in FIGS. 6 to 8, a washing fluid pan device 102 supports a washing fluid pan 110 made of stainless steel 304 via a lifting up and down device 108 by a base frame 106 which is provided with casters 104. The casters 104 rotatingly move along guide rails 109 which are fixed on the floor surface 112.

Figure 9:
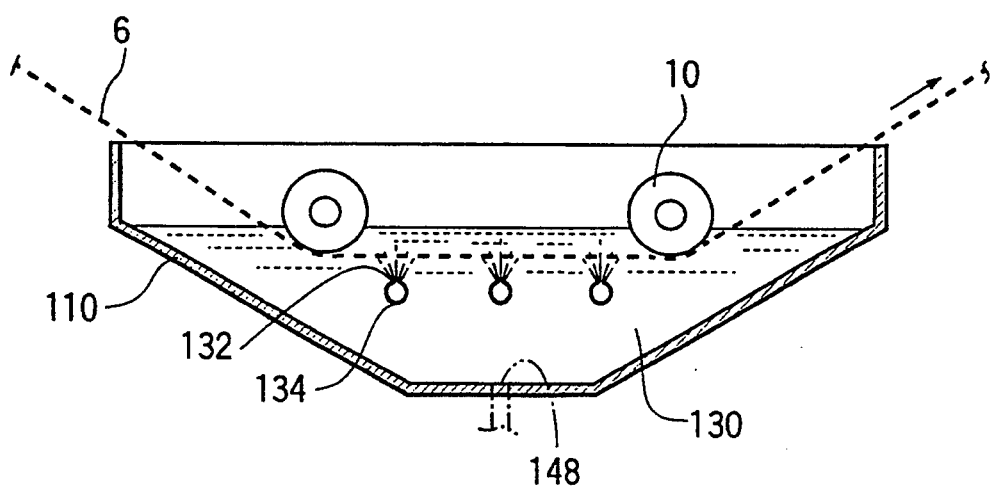
FIG. 9 is a vertical section of the washing fluid pan.

The lifting up and down device 108 includes an operation handle 116, a worm gear mounted on the lower side of a shaft 118 of the operation handle 116, a warm wheel 121 meshing with the worm gear 120 rotatably supported on the base frame 106, a first arm member 122 mounted on the warm wheel 121, a second arm member 124 rotatably supported on the free end of the first arm member 122, and a lifting arm 126 pivotally connected to the base frame 106 at one end and to the washing fluid pan at the other end. Between the net conveyer 6 and the lifting arm 126, the washing fluid pan 110 is pivotally supported. The washing fluid pan 110 is constantly supported at the vertical position by means of vertical guide members (not shown), As shown in FIG. 9, the washing fluid pan 110 includes an injection pipe 134, in which is formed with a plurality of injection holes at the side of the washing fluid receptacle portion 130. A washing fluid pressurizing pump 135 is connected to the washing fluid discharge opening 148 provided in the bottom of the washing fluid receptacle portion 130 at the suction side and to the injection pipe 134 at the discharge side.

Next, the operation of the washing fluid pan device 102 as set forth above will be discussed. During washing operation, the net conveyer 6 is driven at a speed different from that in the heating process, namely at a lower speed than that in the heating process. Then, a brake (not shown) for the caster 104 is released to place the washing fluid pan device 102 at an appropriate position beneath the net conveyer 6 as guided by the guide rail 109. Thereafter, the operation handle 116 of the lifting up and down device 108 is rotatingly operated to drive the worm gear 120 and a bevel gear 121 so that the tilting angles of the first arm 122, the second arm 124 and the lifting arm 126 connected to the base frame 106 at one end and to the second arm 124 at the other end are increased. As a result, the lifting arm 126 drives the washing fluid pan 110 upwardly. Therefore, the washing fluid pan 110 is elevated up.

Then, the transporting path portion of the net conveyer 6 is dipped within an alkaline washing fluid within the washing fluid pan 110. Since the net conveyer 6 deflects the traveling direction in the vertical direction within the washing fluid receptacle portion 130, the net conveyer 6 can be washed for removing grounds or so forth. In addition, the washing fluid pressurizing pump 135 is driven to inject the pressurized washing fluid through the washing fluid discharge opening 148 toward the net conveyer for promoting removal of the grounds from the net conveyer.

In the alternative embodiment, a washing fluid injection pipe is removably mounted on the washing fluid pan. After positioning the washing fluid pan beneath the conveyer belt, the washing fluid injection pipe is arranged above the conveyer belt so that the washing fluid is injected toward the conveyer belt from the above.

With the shown embodiment a washing method for the conveyer belt with a feature, in that a curved path of the conveyer belt of the heat treatment apparatus is provided within an alkaline washing fluid. On the other hand, according to the present invention, a washing apparatus including the conveyer belt of the heat treatment apparatus, which conveyer belt has a downwardly bent curved path, the washing fluid receptacle receiving at least part of the curved path and the alkaline washing fluid filled in the washing fluid receptacle. Therefore, according to the present invention, the washing fluid is never splashed to avoid danger in washing operation and contamination of the surrounding. Furthermore, the washing fluid can be used effectively. In addition, since the configuration of the conveyer belt is varied when the washing fluid is sprayed onto the conveyer belt, washing becomes effective by variation of the surface configuration and the positional relationship of the components.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A method for washing a conveyer belt in a heat treatment apparatus having operational modes including a conveyor belt washing mode, the conveyor belt having components having configuration and positional relationships, comprising the steps of:
   (a) providing a washing fluid bath containing a washing fluid;
   (b) placing the washing fluid bath in a portion of a traveling path of the conveyor belt, within which bath at least one of the configuration and positional relationship of the components of the conveyor belt longitudinally varies, to dip the conveyor belt at the portion within the washing fluid bath;
   (c) placing the washing fluid bath out of the traveling path of the conveyor belt in an operation mode of the heat treatment apparatus other than the conveyor washing mode; and
   (d) driving the conveyor belt along the traveling path at a first speed in the operational modes of the heat treatment apparatus other than the conveyor belt washing mode and at a second speed different from the first speed in the conveyor belt washing mode.

2. The method as set forth in claim 1, wherein in said step (d), the second speed is lower than the first speed.

3. A method for washing a conveyer belt in a heat treatment apparatus having operational modes including a conveyor belt washing mode, the conveyor belt having components having configuration and positional relationships, comprising the steps of:
   (a) providing a washing fluid bath containing a washing fluid;
   (b) placing the washing fluid bath in a portion of a traveling path of the conveyor belt, within which bath at least one of the configuration and positional relationship of the components of the conveyor belt longitudinally varies, to dip the conveyor belt at the portion within the washing fluid bath;
   (c) injecting washing fluid toward the conveyor belt within the washing fluid bath; and
   (d) placing the washing fluid bath out of the traveling path of the conveyor belt in an operation mode of the heat treatment apparatus other than the conveyor washing mode.

4. An apparatus for washing a conveyor belt of a heat treatment apparatus in which the conveyor belt travels along a predetermined traveling path including at least one deflecting portion at which the traveling direction of the conveyor belt is varied in a vertical direction, said apparatus comprising:
   a washing bath configured for containing a washing fluid therein;
   means for selectively placing said washing bath at the deflecting portion, whereby the conveyor belt is dipped within the washing fluid in the washing bath while it travels across the deflecting portion; and
   conveyor belt driving means for driving the conveyor belt along the traveling path at a first speed while the heat treatment apparatus operates in a process mode for performing heat treatment and for driving the conveyor belt along the traveling path at a second speed different from the first speed while said conveyor belt washing apparatus is active.

5. The apparatus of claim 4, wherein the first speed of said conveyor belt driving means is higher than the second speed.

6. An apparatus for washing a conveyor belt of a heat treatment apparatus in which the conveyor belt travels along a predetermined traveling path including at least one deflecting portion at which the traveling direction of the conveyor belt is varied in a vertical direction, said apparatus comprising:
   a washing bath configured for containing a washing fluid therein, said washing bath being selectively movably separated from the traveling path of the conveyor belt;
   means for selectively placing said washing bath at the deflecting portion, whereby the conveyor belt is dipped within the washing fluid in the washing bath while it travels across the deflecting portion; and
   means for shifting said washing bath between a first position away from the deflected portion while the heat treatment apparatus operates in a process mode for performing heat treatment and a second position dipping the conveyor belt at the deflecting portion within the washing fluid in the washing bath while said conveyor belt washing apparatus is active.

7. The apparatus of claim 6, further comprising means for exerting an operational force on said shifting means for selectively placing said washing bath at the first and second positions, said force exerting means being manually operable.

8. The apparatus of claim 7, further comprising a structural component which is stationary in a vertical direction; and wherein said shifting means includes a pivotal lever having a first end pivoted on said structural component, a second end connected to said washing bath, and an actuation point on which the operational force of said force exerting means acts, said actuation point being placed in the vicinity of said second end.

9. An apparatus for washing a conveyor belt of a heat treatment apparatus in which the conveyor belt travels along a predetermined traveling path including at least one deflecting portion at which the traveling direction of the conveyor belt is varied in a vertical direction, said apparatus comprising:

a washing bath configured for containing a washing fluid therein;

means for selectively placing said washing bath at the deflecting portion, whereby the conveyor belt is dipped within the washing fluid in the washing bath while it travels across the deflecting portion;

means for shifting said washing bath between a first position away from the deflected portion while the heat treatment apparatus operates in a process mode for performing heat treatment and a second position dipping the conveyor belt at the deflecting portion within the washing fluid in the washing bath while said conveyor belt washing apparatus is active; and conveyor belt driving means for driving the conveyor belt along the traveling path at a first speed while the heat treatment apparatus operates in a process mode for performing heat treatment and for driving the conveyor belt along the traveling path at a second speed different from the first speed while said conveyor belt washing apparatus is active.

10. An apparatus for washing a conveyor belt of a heat treatment apparatus in which the conveyor belt travels along a predetermined traveling path including at least one deflecting portion at which the traveling direction of the conveyor belt is varied in a vertical direction, said apparatus comprising:

a washing bath configured for containing a washing fluid therein;

means for selectively placing said washing bath at the deflecting portion, whereby the conveyor belt is dipped within the washing fluid in the washing bath while it travels across the deflecting portion; and means for injecting washing fluid toward the conveyor belt, said washing fluid injecting means being disposed within said washing bath so as to inject the washing fluid toward the conveyor belt within the washing fluid in said washing bath.

11. An apparatus for washing a conveyor belt of a heat treatment apparatus in which the conveyor belt travels along a predetermined traveling path including at least one deflecting portion at which the traveling direction of the conveyor belt is varied in a vertical direction, said apparatus comprising:

a washing bath configured for containing a washing fluid therein, said washing bath being selectively movably separated from the traveling path of the conveyor belt;

means for selectively placing said washing bath at the deflecting portion, whereby the conveyor belt is dipped within the washing fluid in the washing bath while it travels across the deflecting portion; and a base frame having a plurality of wheels for moving said washing bath and said placing means.

* * * * *